US008111630B2

(12) United States Patent
Kovvali et al.

(10) Patent No.: US 8,111,630 B2
(45) Date of Patent: Feb. 7, 2012

(54) CONTENT CACHING IN THE RADIO ACCESS NETWORK (RAN)

(75) Inventors: Surya Kumar Kovvali, Westborough, MA (US); Ramji Raghavan, Winchester, MA (US); Krishnan Ramakrishnan, Hopkinton, MA (US)

(73) Assignee: Movik Networks, Westford, MA (US)

( * ) Notice: Subject to any disclaimer, the term of this patent is extended or adjusted under 35 U.S.C. 154(b) by 67 days.

(21) Appl. No.: 12/536,537

(22) Filed: Aug. 6, 2009

(65) Prior Publication Data

US 2010/0034089 A1      Feb. 11, 2010

Related U.S. Application Data

(60) Provisional application No. 61/086,521, filed on Aug. 6, 2008.

(51) Int. Cl.
 *H04J 1/16* (2006.01)
 *H04J 3/16* (2006.01)
 *H04L 12/28* (2006.01)
(52) U.S. Cl. ......... 370/252; 370/352; 370/401; 370/466
(58) Field of Classification Search .................. 370/252, 370/352, 466, 410, 395.1
 See application file for complete search history.

(56) References Cited

U.S. PATENT DOCUMENTS

| | | | |
|---|---|---|---|
| 6,907,501 B2 | 6/2005 | Tariq et al. | |
| 7,318,100 B2 | 1/2008 | Demmer et al. | |
| 2003/0003919 A1 | 1/2003 | Beming et al. | |
| 2004/0068571 A1* | 4/2004 | Ahmavaara | 709/228 |
| 2004/0264368 A1 | 12/2004 | Heiskari et al. | |
| 2005/0135428 A1 | 6/2005 | Hellgren | |
| 2005/0157646 A1 | 7/2005 | Addagatla et al. | |
| 2006/0018294 A1 | 1/2006 | Kynaslahti et al. | |
| 2006/0117139 A1 | 6/2006 | Kobayashi et al. | |
| 2006/0159121 A1 | 7/2006 | Sakata et al. | |
| 2006/0274688 A1 | 12/2006 | Maxwell et al. | |
| 2007/0025301 A1 | 2/2007 | Petersson et al. | |
| 2007/0223379 A1 | 9/2007 | Sivakumar et al. | |
| 2007/0254671 A1* | 11/2007 | Liu | 455/446 |
| 2008/0186912 A1 | 8/2008 | Huomo | |
| 2008/0191816 A1 | 8/2008 | Balachandran et al. | |

(Continued)

FOREIGN PATENT DOCUMENTS

WO    2008/076073    6/2008

OTHER PUBLICATIONS

The International Search Report/Written Opinion dated Mar. 1, 2010 in co-pending application (PCT/US2009/069260).

(Continued)

*Primary Examiner* — Andrew Lee
(74) *Attorney, Agent, or Firm* — Nields, Lemack & Frame, LLC

(57) ABSTRACT

A system and method to intercept traffic at standard interface points as defined by Cellular/Wireless networks (GSM/GPRS, 3G/UMTS/HSDPA/HSUPA, CDMA, WIMAX, LTE), emulate the respective protocols on either side of the interception point, extract user/application payloads within the intercepted packets, perform optimizations, and re-encapsulate with the same protocol, and deliver the content transparently is disclosed. The optimizations include but are not limited to Content Caching, prediction & pre-fetching of frequently used content, performance of content-aware transport optimizations (TCP, UDP, RTP etc.) for reducing backhaul bandwidth, and improvement of user experience. An additional embodiment of the current invention includes injecting opportunistic content (location based, profile based or advertisement content) based on the information derived while monitoring control plane protocols.

28 Claims, 12 Drawing Sheets

RAN Cache: User Plane

U.S. PATENT DOCUMENTS

| | | | |
|---|---|---|---|
| 2009/0029644 | A1 | 1/2009 | Sue et al. |
| 2009/0156213 | A1* | 6/2009 | Spinelli et al. ............... 455/436 |
| 2009/0196233 | A1* | 8/2009 | Zhu et al. ..................... 370/328 |
| 2009/0210904 | A1 | 8/2009 | Baron et al. |
| 2009/0274224 | A1* | 11/2009 | Harris ........................... 375/260 |
| 2010/0057887 | A1* | 3/2010 | Wang et al. .................. 709/219 |
| 2010/0085962 | A1* | 4/2010 | Issaeva et al. ................ 370/355 |
| 2010/0184421 | A1* | 7/2010 | Lindqvist et al. ............. 455/418 |
| 2010/0215015 | A1* | 8/2010 | Miao et al. ................... 370/329 |
| 2010/0272021 | A1* | 10/2010 | Kopplin et al. ............... 370/328 |

OTHER PUBLICATIONS

The International Search Report/Written Opinion dated Mar. 12, 2010 in co-pending application (PCT/US2010/22542).

RFC 3135—Performance Enhancing Proxies Intended to Mitigate Link-Related Degradations, J. Border et al.; Jun. 2001—http://www.faqs.org.rfcs/rfc3135.html.

RFC 1644—T/TCP—TCP Extensions for Translations Functional Specification, R. Braden, 1994, Jul. 1994—http://www.faqs.org/rfcs/rfc1644.html.

RFC 2045—Multipurpose Internet Mail Extensions (MIME) Part One: Formal of Internet Message bodies; N. Freed et al.; Nov. 1996—Http://www.faqs.org/rfcs/rfc2045.htrnl.

3GPP TR 23.829 V0.4.0 (Jan. 2010), Technical Report, "3rd Generation Partnership Project; Technical Specification Group Services and System Aspects; Local IP Access and Selected IP Traffic Offload; (Release 10)", 29 pages, 3GPP Organizational Partners.

Http header enrichment, http://news.thomasnet.com/fullstory/Software-optimizes-high-speed-wireless-data-networks-485934, "Software optimizes high-speed wireless data networks", Jun. 26, 2006, 10 pages, Thomasnet News.

International Search Report and Written Opinion dated May 13, 2011 in co-pending foreign patent application No. PCT/US11/28477.

* cited by examiner

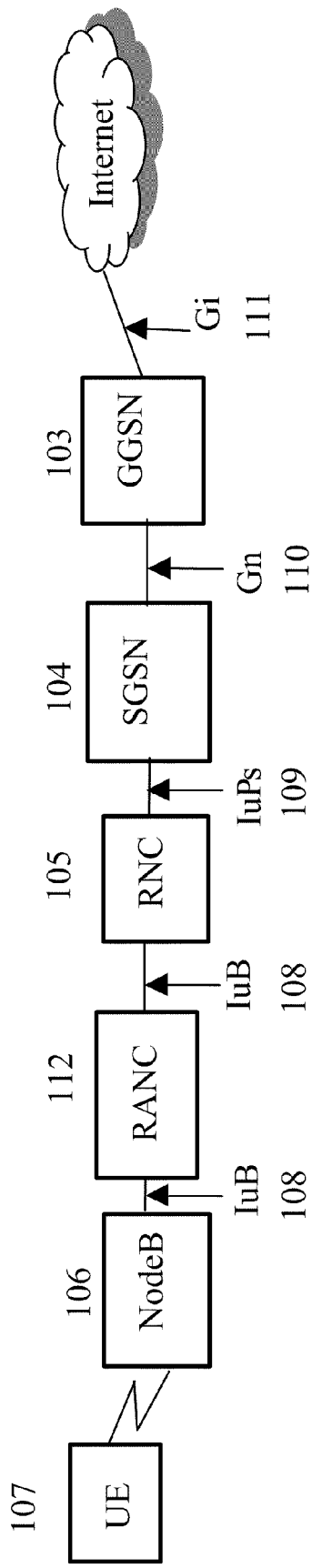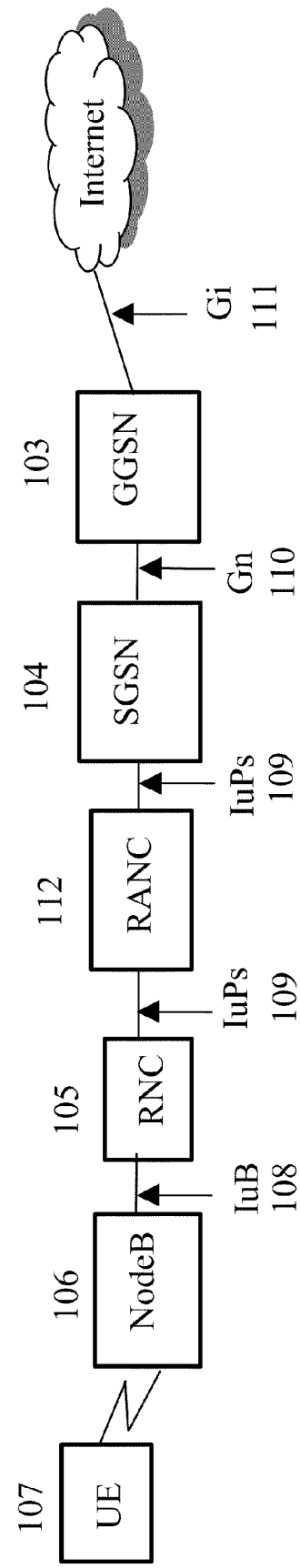
FIG. 3
FIG. 4

CONTENT CACHING IN THE RADIO ACCESS NETWORK (RAN)

This application claims priority of U.S. Provisional Patent Application Ser. No. 61/086,521, filed Aug. 6, 2008, the contents of which are herein incorporated by reference in their entirety.

BACKGROUND

The exponential growth of the Internet and World Wide Web required substantially scalable data delivery solutions for ever increasing cable, DSL and other wireline broadband networks. Mirroring or replication of some sites at different geographical locations was not adequate to meet the exponential growth of data traffic. Content Delivery Networks (CDN) emerged to address the scalability and performance problems posed by ever-increasing broadband subscribers and traffic. CDNs use a variety of techniques including web caching to reduce bandwidth requirements, reduce server load, and improve the user response times for content stored in the cache. Specifically, web caching refers to the storing of copies of web documents such as HTML pages, video, image and other multimedia objects in a distributed cache; subsequent requests for web content may be satisfied from the cache if certain conditions are met. CDNs achieve reduced round trip times for interactive web-browsing sessions by bringing content closer to the user. CDNs may also pre-fetch and store content in their caches before the actual request is made in order to increase the cache hit rate Some wireline providers also deploy web caches in their networks in order to reduce their Internet bandwidth needs and enhance the web browsing experience for their subscribers as shown in FIG. 1a.

Content caching devices, or web-caches, that cache frequently viewed web pages, pictures and multi-media content are traditionally deployed in the internet for reducing transport latencies, and reducing download times for heavily accessed content across the internet. Similarly, web-proxies/caches are also deployed at enterprise sites to cache frequently used Internet web-content within the enterprise network. Such devices are currently used within mobile wireless networks, with certain limitations.

FIG. 1a shows the network elements in an exemplary wireline network, as is commonly found today. Multiple user devices 7 attach to a local network medium, such as DSL, cable, or other internet connection. The local DSL or cable backhaul 8 connects to the metro network 9, such as through a DSLAM (DSL Access Multiplexer) or CMTS (Cable Modem Terminal System) 11. Routers 2 are used to move packets through the internet 12 in accordance with their source and destination addresses. Servers 14 host websites that contain the original content for those websites. However, in an effort to save time and network traffic, web caches 1 or other similar devices are used to store replicas of this original content. Thus, throughout the internet, there may be one or more web caches 1 that provide the requested data without having to burden server 14. In large metro areas, it is also common to introduce cache servers 1 in the metro network 9.

Caching devices can also be used in mobile wireless network, for example, a 3G/UMTS network 20. The wireless network includes a Radio Access Network (RAN) and a Core Network (CN). A typical wireless network is shown in FIG. 1b.

The GGSN 3 (Gateway GPRS Service Node) connects the mobile wireless network to the IP Core Network. The Gateway GPRS Support Node (GGSN) 3 is a main component of the GPRS (General Packet Radio Service) network. The GGSN 3 is responsible for compatibility between the GPRS network and external packet switched networks, such as the Internet and X.25 networks.

When viewed from an external network, the GGSN 3 appears as a router to a sub-network, because the GGSN 3 hides the GPRS infrastructure from the external network. When the GGSN 3 receives data addressed to a specific user, it checks if the user is active. If it is, the GGSN 3 forwards the data to the SGSN 4 serving the mobile user. However if the mobile user is inactive, the data are discarded, or a paging procedure is initiated to locate and notify the mobile device. For data originated within the GPRS network, the GGSN 3 routes these mobile-originated packets to the correct external network.

The GGSN 3 converts the GPRS packets coming from the SGSN 4 into the appropriate packet data protocol (PDP) format (e.g., IP or X.25) and sends them out on the corresponding packet data network. For incoming packets, the PDP addresses are converted to the GSM address of the destination user. The readdressed packets are then sent to the responsible SGSN 4. In order to accomplish this function, the GGSN 3 stores the current SGSN address of the user and its associated profile in its location register. The GGSN 3 is responsible for IP address assignment and is the default router for the connected user equipment (UE) 7. The GGSN 3 also performs authentication functions.

A Serving GPRS Support Node (SGSN) 4 is responsible for the delivery of data packets from and to the mobile stations within its geographical service area. Its tasks include packet routing and transfer, mobility management (attach/detach and location management), logical link management, and authentication and charging functions. The location register of the SGSN 4 stores location information and user profiles of all GPRS users registered with this SGSN 4.

The Radio Network Controller (or RNC) 5 is a governing element in the radio access network and is responsible for controlling the Node Bs 6 that are connected to it. The RNC 5 carries out radio resource management, some of the mobility management functions and is the point where encryption is done before user data is sent to and from the mobile. The RNC 5 connects to the SGSN (Serving GPRS Support Node) 4 in the Packet Switched Core Network.

Node B 6 is a term used to denote the base transceiver station (BTS) in the UMTS/3GPP Architecture. As in all cellular systems, such as GSM, Node B (or BTS) 6 contains radio frequency transmitter(s) and the receiver(s) used to communicate directly with the user equipment, which move freely around it.

The user equipment (UE) 7 comprises all user equipment, including handsets, smart phones and computing equipment.

Radio Access Networks (RANs), such as in GSM/GPRS, 3G/UMTS/HSDPA/HSUPA, LTE, CDMA network etc., have their own private networks (PLMN) and interconnect to the Internet/IP networks through gateway devices (GGSN in GSM/GPRS, 3G/UMTS/HSDPA/HSUPA, and PDSN in CDMA). Content caches are typically deployed outside of the RAN as shown in FIG. 1b. However, content caches are not deployed in the RAN between the Wireless Base Station 6 and GGSN 3 or PDSN (in a CDMA Network).

One reason for this is, while the user application payloads are TCP/IP, those payloads are embedded within Radio Access Network Protocols that are specific to the specific RAN. Thus, within the RAN, application payloads are not directly visible for performing content-aware caching and other optimizations. The RAN network 20 is deployed as a transport network that transports user IP traffic (Bearer IP traffic) using either ATM or IP transports. Regardless of the type of transport, the RAN network transports the user payloads in per user/per service tunnels. Such tunnels are terminated within the PDSN or GGSN 3, which forwards the bearer IP traffic to the public IP network using IP forwarding rules. Thus in the prior art deployments, the RAN network is content un-aware.

Therefore, it would be beneficial if caching devices could be made to operate within the RAN. This would allow more efficient access to content, minimize internet traffic and transfer times. Furthermore, network elements in the RAN are more localized, with lower capacity (throughput and simultaneous users). This facilitates insertion of a lower capacity caching and content-aware optimization device. Such a network would better scale as it facilitates distributed deployment. A method and system to allow caching within a RAN would be advantageous.

SUMMARY

The present invention defines methods to intercept traffic at standard interface points as defined by Cellular/Wireless networks (GSM/GPRS, 3G/UMTS/HSDPA/HSUPA, CDMA, WIMAX, LTE), emulate the respective protocols on either side of the interception point, extract user/application payloads within the intercepted packets, perform optimizations, and re-encapsulate with the same protocol, and deliver the content transparently. The optimizations include but are not limited to Content Caching, prediction & pre-fetching of frequently used content, performance of content-aware transport optimizations (TCP, UDP, RTP, HTTP, HTML etc.) for reducing back-haul bandwidth, and improvement of user experience. An additional embodiment of the current invention includes injecting opportunistic content (location based, profile based, past history based, or advertisement content) based on the information derived while monitoring control plane protocols. The methods outlined remove interface protocol layers on the intercepted interface to facilitate caching and content delivery optimizations, such as deep-packet inspection of user application packets, collection of Business Intelligence, enforcement of operator defined policy controls to protect operator's RAN network, validation of user's access privileges, and prevention of access to unauthorized content (for example parental controls).

BRIEF DESCRIPTION OF THE DRAWINGS

In order to facilitate a fuller understanding of the present disclosure, reference is now made to the accompanying drawings, in which like features are referenced with like numerals. These figures should not be construed as limiting the present disclosure, but are intended to be exemplary only.

FIG. 3 is an example configuration showing the deployment of the RAN Cache (RANC) on the IuB interface between the Node B and RNC in the 3GPP/UMTS Network;

FIG. 4 is an example configuration showing the deployment of the RAN Cache (RANC) on the IuPS interface between the RNC and SGSN in the 3GPP/UMTS Network;

DETAILED DESCRIPTION OF THE INVENTION

Figure 1A:
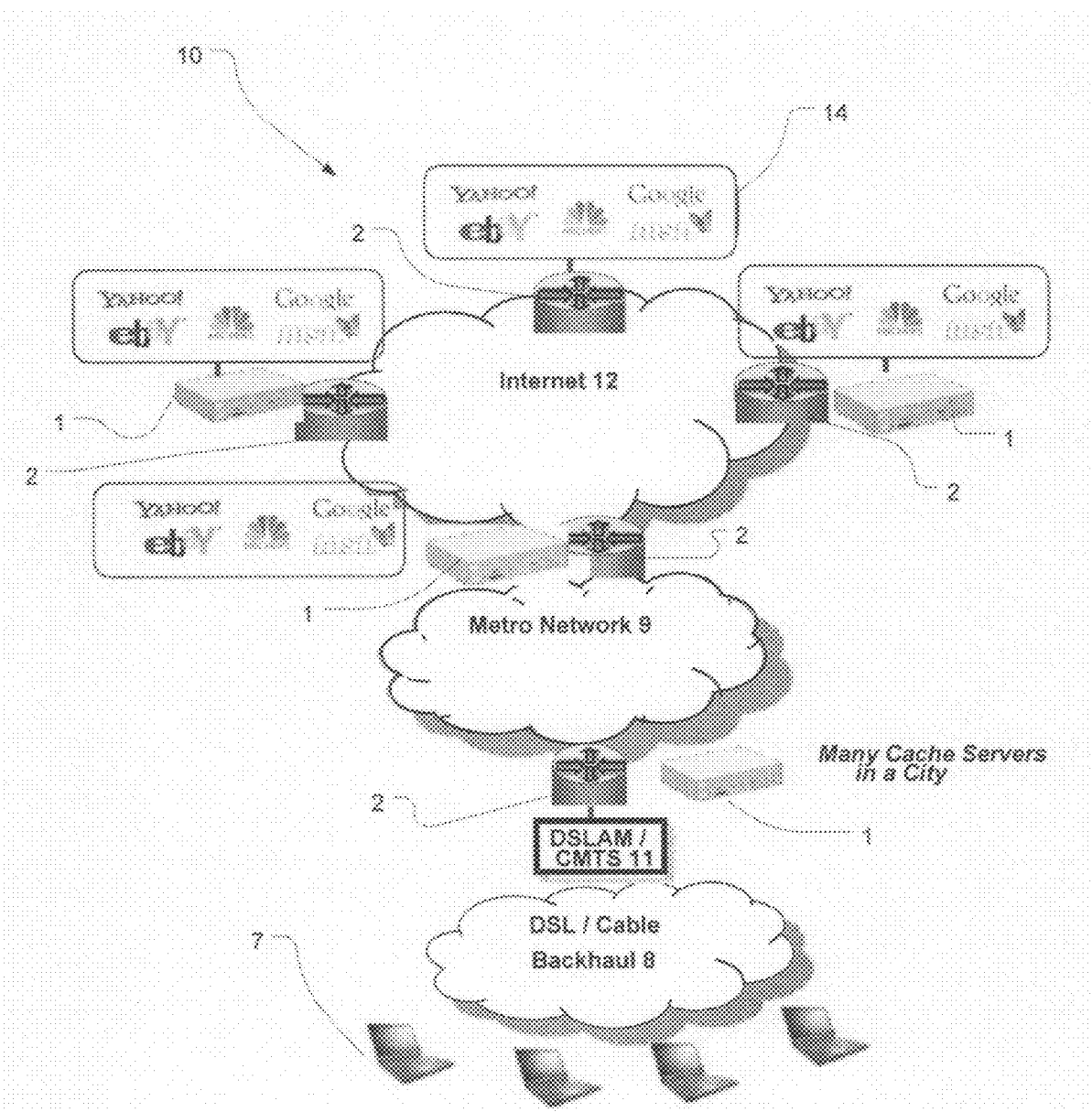
FIGS. 1a & 1b illustrate deployments of Content Caches in the Wireline Network and Mobile Operator Networks, respectively, in the prior art.
Figure 1B:
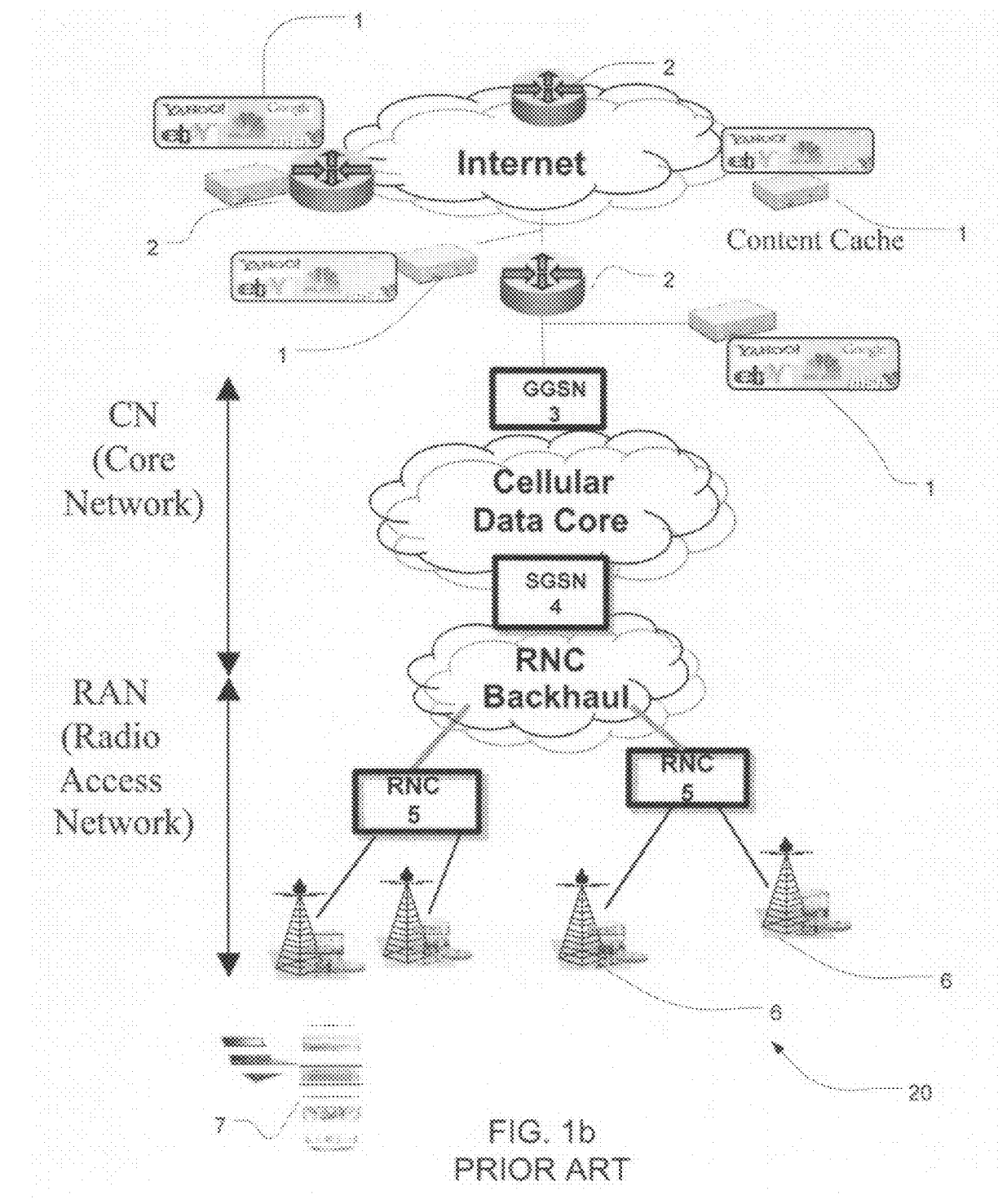
Figure 2:
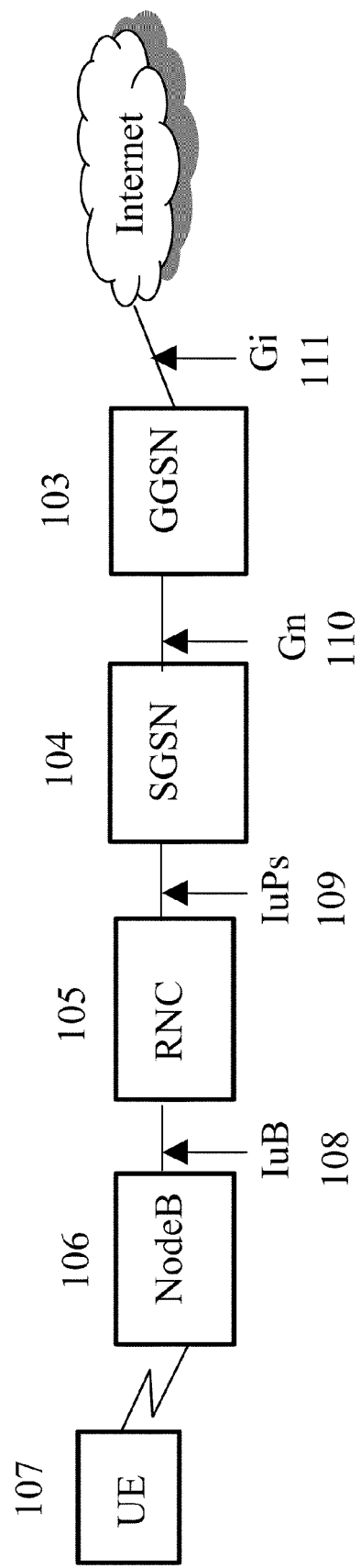
FIG. 2 shows an example Cellular Operator's 3G/UMTS network, showing the 3GPP Standards defined Network Elements and the corresponding interfaces between these Network Elements.

FIG. 2 shows a traditional 3G/UMTS network, including an UE (user equipment) 107, NodeB (or base transceiver station) 106, RNC (radio network controller or base station controller) 105, SGSN (Serving GPRS support node) 104, and a GGSN (gateway GPRS Support node) 103. Also shown in FIG. 2 is the protocol used to communicate between these various devices. For example, IuB 108 is the protocol used between Node B 106 and the RNC 105. Similarly, IuPS is the protocol used between the RNC 105 and the SGSN 104. Gn 110 is used between the SGSN 104 and the GGSN 103. Finally, Gi 111 is the IP based interface between the GGSN 103 and the internet.

Figure 5:
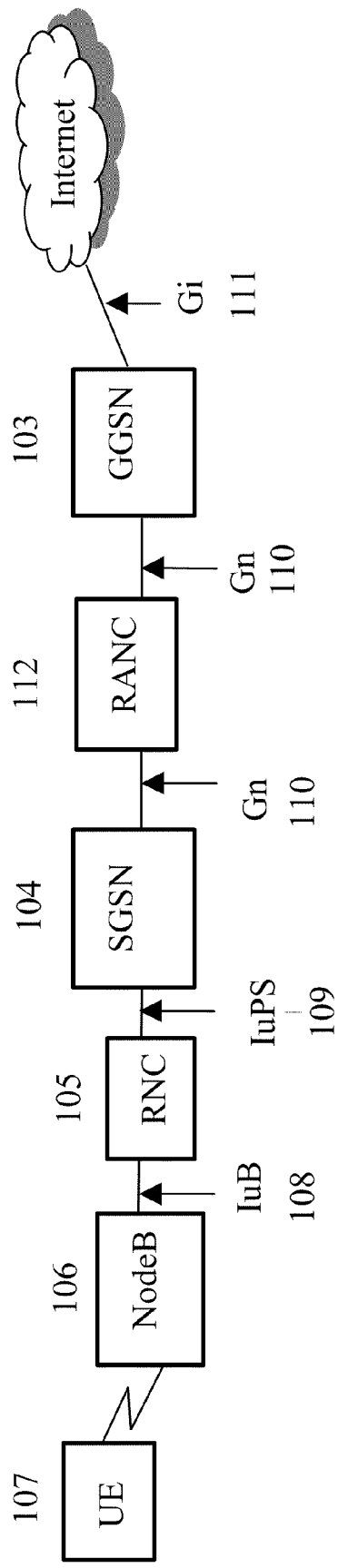
FIG. 5 is an example configuration showing the deployment of the RAN Cache (RANC) on the Gn interface between the SGSN and GGSN in the 3GPP/UMTS Network.

FIGS. 3 through 5 each illustrate a possible interception point where the RAN Cache (RANC) device may be inserted in a 3G/UMTS network. In FIG. 3, the RANC 112 is located between the Node B 106 and the RNC 105. In FIG. 4, the RANC 112 is located between the RNC 105 and the SGSN 104. In FIG. 5, the RANC 112 is located between the SGSN 104 and the GGSN 103. These figures are example deployment scenarios in a 3G/UMTS network; while example deployments in other RAN networks, such as in a CDMA network are not shown, the methods described here are equally applicable to such networks as well.

Figure 13:
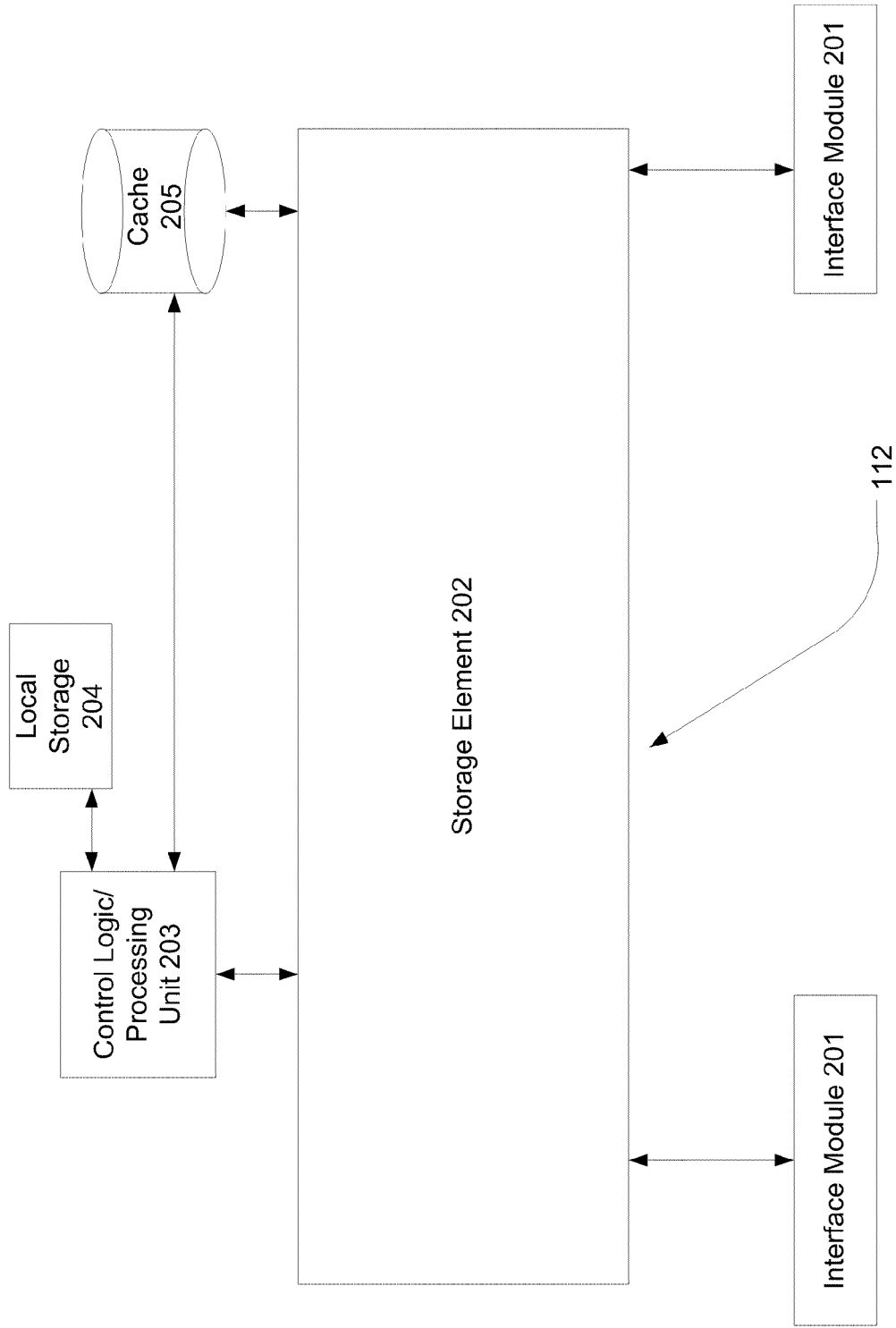
FIG. 13 shows a block diagram of the RANC in accordance with one embodiment.

FIG. 13 shows a representative block diagram of the RANC. The RANC 112 has two interface modules 201, each of which is adapted to implement the hardware signaling required for the choice interface and the associated software protocol. This interface protocol may be IuB, IuPS or Gn, as shown in FIGS. 3-5. Each interface module 201 is adapted to receive and transmit on the selected interface. Additionally, received data is placed into a storage element 202, typically a semiconductor storage element such as a RAM, DRAM or an equivalent technology. The movement of data from the interface module to the memory 202 and vice versa may be accomplished using dedicated hardware, such as a DMA controller. Alternatively, a dedicated data movement processor may be used to handle the actual movement of data through the RANC 112. Once stored within the RANC 112, the information is processed in accordance with the RAN specifications. This may be done using dedicated control logic or a processing unit 203. The control logic/processing unit 203 may have its own local storage element 204, which contains instructions to execute and local status. This storage element may be RAM or DRAM. In addition, at least a portion of this storage element 204 may be non-volatile, such as ROM, FLASH ROM, hard disk, Solid State Disk, or the like. Using known specifications and protocols, the control logic/processing unit 203 parses the received information to understand the packet at each protocol layer. Also included may be a large storage element 205, adapted to hold cached information. In some embodiments, this cache storage may be semiconductor memory, such as RAM or DRAM. In other embodiments, this cache storage may be a rotating media, such as a disk drive or other large storage device. The control logic/processing unit may be physically implemented in a variety of technologies. For example, it may be a general-purpose processor, executing a set of instructions from an internal or external storage device.

In another embodiment, a dedicated hardware device having embedded instructions or state machines may be used to perform the functions described. Throughout this disclosure, the terms "control logic" and "processing unit" are used interchangeably to designate an entity adapted to perform the set of functions described.

The RANC also contains software capable of performing the functions described herein. The software may be written in any suitable programming language and the choice is not limited by this disclosure. Additionally, all applications and software described herein are computer executable instructions that are contained on a computer-readable media. For example, the software and applications may be stored in a read only memory, a rewritable memory, or within an embedded processing unit. The particular computer on which this software executes is application dependent and not limited by the present invention.

Figure 6:
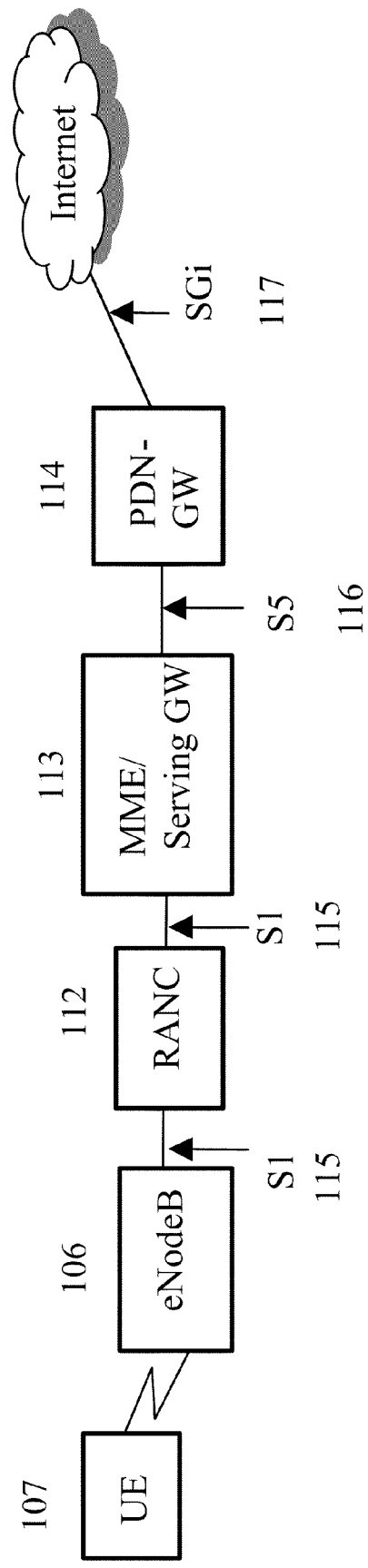
FIG. 6 is an example configuration showing the deployment of the RAN Cache (RANC) on the S1 interface between the eNodeB and MME/Serving Gate Way in the LTE/E-UT-RAN Network.

FIG. 6 shows a possible interception point for the RANC device in a 4G/LTE network. In the LTE network, the SGSN and GGSN are replaced by a Mobile Management Entity (MME)/Serving-Gateway (SG) 113 and a PDN Gateway (PDN-GW) 114. Although not shown, in another embodiment, the MME and Serving Gateway are separate devices. Both embodiments are within the scope of the invention The MME 113 is the key control-node for the LTE access-network. It is responsible for idle mode UE (User Equipment) 107 tracking and paging procedure including retransmissions. It is involved in the bearer activation/deactivation process and is also responsible for choosing the serving gateway for a UE 107 at the initial attach and at time of intra-LTE handover involving Core Network (CN) node relocation. It is responsible for authenticating the user. It checks the authorization of the UE 107 to camp on the service provider's Public Land Mobile Network (PLMN) and enforces UE roaming restrictions. The MME 113 is the termination point in the network for ciphering/integrity protection for NAS signaling and handles the security key management. Lawful interception of signaling is also supported by the MME 113.

The Serving Gateway (SG) routes and forwards user data packets, while also acting as the mobility anchor for the user plane during inter-eNodeB handovers and as the anchor for mobility between LTE and other 3GPP technologies (terminating the S4 interface and relaying the traffic between 2G/3G systems and PDN-GW). It manages and stores UE contexts, e.g. parameters of the IP bearer service, network internal routing information.

Thus, the MME serves as a control plane device, while the SG is a user plane device. While these entities are physical separate, the interface to the MME is S1-Control plane, while the interface to the SG is S1-user plane. In the embodiment where they are physically together, the interface is simply S1.

The PDN Gateway (PDN-GW) 114 provides connectivity from the UE 107 to external packet data networks by being the point of exit and entry of traffic for the UE 107. A UE 107 may have simultaneous connectivity with more than one PDN-GW 114 for accessing multiple PDNs. The PDN-GW 114 performs policy enforcement, packet filtering for each user, charging support, lawful Interception and packet screening. Another key role of the PDN-GW is to act as the anchor for mobility between 3GPP and non-3GPP technologies such as WiMAX and 3GPP2 (CDMA 1X and EvDO).

In such an environment, the RANC 112 can be inserted between the eNode B 106 and the MME 113, using the S1 interface 115 at both ends. Alternatively, RANC 112 may be inserted between the MME/Serving Gateway and the PDN-GW 114 using the S5 interface.

In the case where the MME and SG are separate, the RANC may logically be between the eNodeB and the MME in the control plane and between the eNodeB and the SG in the user plane, using the S1 protocol.

Having described the various locations within the RAN network where the RANC can be placed, a description of its operation now follows. While the protocol diagrams shown in FIGS. 7-11 illustrate the scenario in which the RANC is placed on the IuPS interface between the RNC and SGSN in the 3G/UMTS network, the methods of the current invention are applicable when it is placed on other interfaces in mobile network in 3G/UMTS network.

Figure 7:
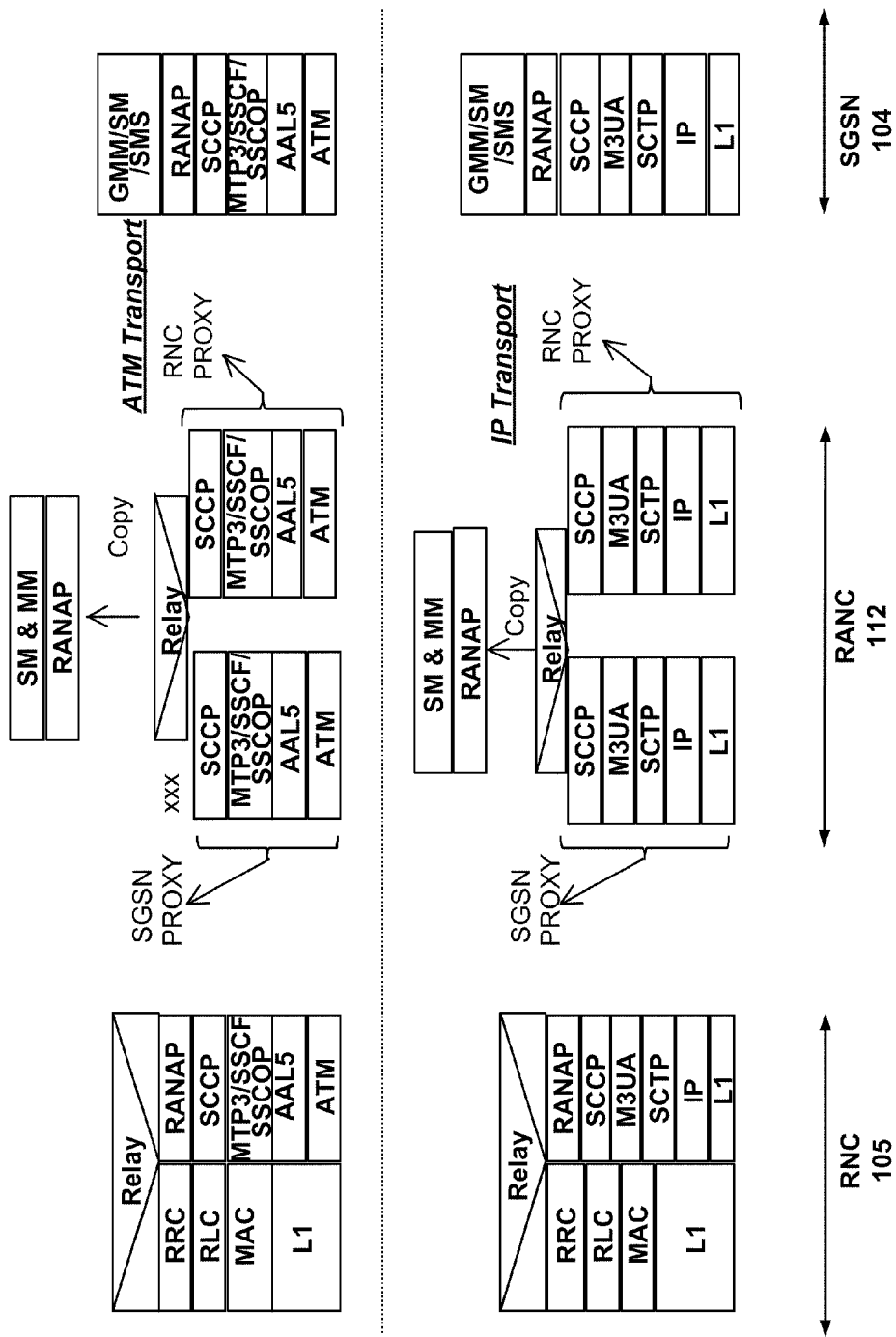
FIG. 7 illustrates the control protocol layers within the RANC when operating as a double proxy between the RNC and SGSN.

FIG. 7 illustrates the control protocol layers within the RANCache (RANC) when operating as a double proxy. The control plane is used to deliver information concerning the user and the various connections, such as quality of service (Qos) requirements, usage policies, relocation requests, etc. In this embodiment, the RANC appears as a SGSN Proxy at the interception point towards the RNC 105, and as a RNC Proxy at the interception point towards the SGSN 104. The upper portion of FIG. 7 shows the ATM transport protocol layers, while the lower portion shows the IP transport protocol layers, as defined in the 3GPP Protocol standards. In this example, the RANC saves IuPS Control packets at the RANAP (Radio Access Network Application Part) layer and uses these packets to extract per User Session information to associate dataplane tunnels (GPRS Tunneling Protocol-User (or GTP-U) tunnels). GTP-U is a relatively simple IP based tunneling protocol which permits many tunnels between each set of end points. Tunnels may be created for each PDP context that they have. Additionally, each tunnel may specify a different set of QOS parameters.

In operation, software operates at each level to parse the information required at that level. After the protocol information for that layer has been stripped off, the remainder of the packet is forwarded to the next higher protocol layer. This process continues until the packet has been fully decomposed. In the case of pass through traffic, the packet is then reconstructed by appending protocol information as the packet is passed down the layers. In other words, packet headers are reattached in the opposite order in which they are removed, such that the L1 information is the first to be removed on an incoming packet and the last to be appended on an outgoing packet.

Figure 8:
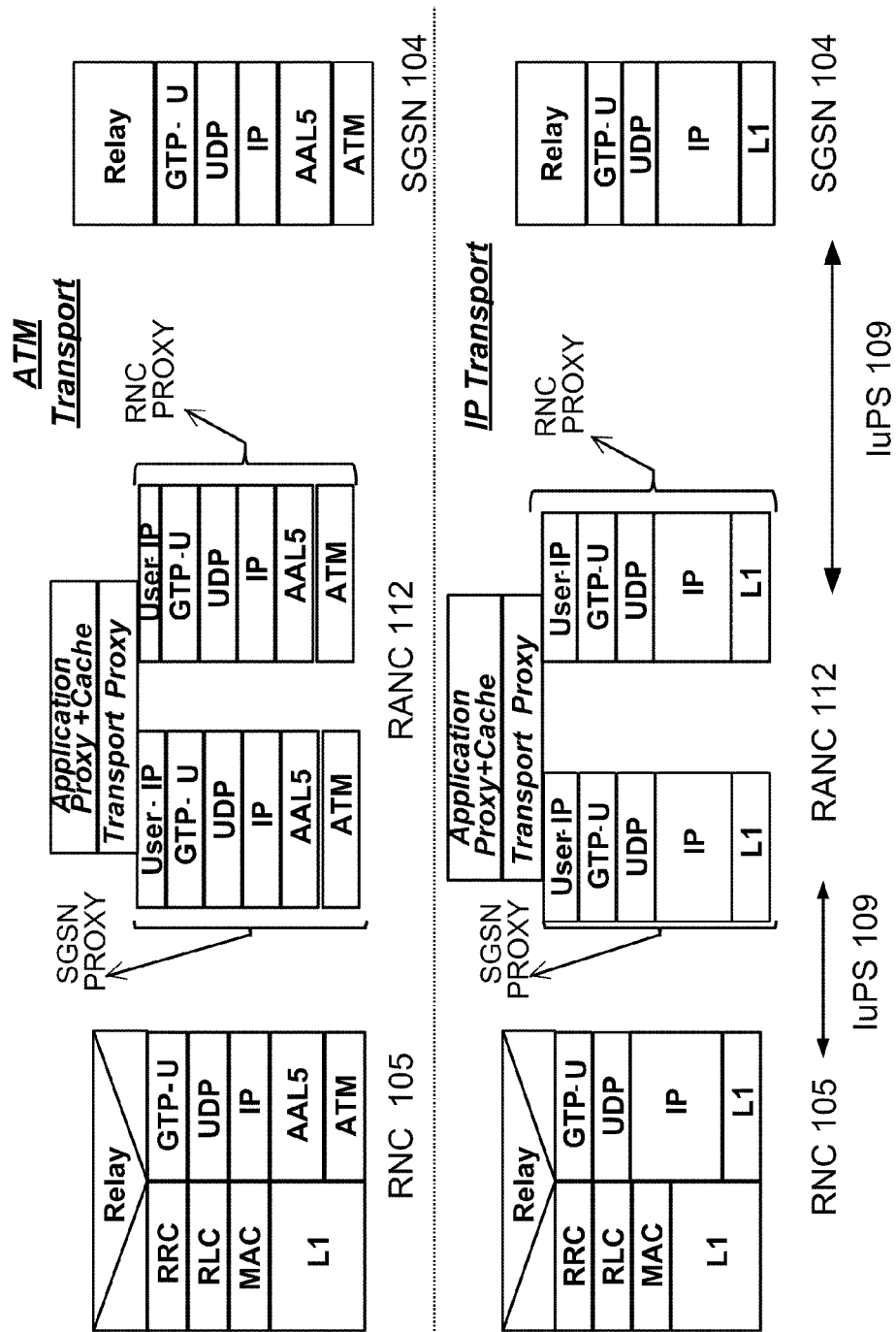
FIG. 8 illustrates the User Plane Protocols that the RANC intercepts and extracts Per User Traffic when it is placed on the IuPS interface in 3GPP/UMTS network.

FIG. 8 illustrates the User Plane Protocols that the RANCache (RANC) intercepts and uses to extract Per User Traffic when it is placed on the IuPS interface in 3GPP/UMTS network, as shown in FIG. 4. As the name implies, the user plane is used to deliver the data requested by the user, such as web pages, and the like. This figure shows the IP and ATM transport options as specified in the 3GPP Standards. The protocol names shown in the figure (L1, MAC, RLC, RRC, GTP-U, AAL5, ATM etc.) are as specified in 3GPP TS25.401, UTRAN Overall Description, which is herein incorporated by reference in its entirety.

FIG. 8 shows the RANC 112 terminating the transport protocols below the User-IP layer within the IuPS stack on the RNC 105 and SGSN 104 interfaces. The RANC 112 also extracts the User Payload and performs transport level or application level proxy+Cache operations. These operations occur at a level above the User-IP level.

The transport level proxy operation includes, but is not limited to, terminating the transport level connection, such as the TCP connection, extracting the application payload, and forwarding the application payload on a new TCP connection on the other interface. When forwarding the payload on the new connection, the payload is re-encapsulated using the same IuPS protocols on the $2^{nd}$ interface.

The Application Proxy and Cache operation includes, but is not limited to, understanding the application protocol, such as HTTP, RTMP, FTP etc., understanding the object types such as HTML, video objects etc., performing application optimizations, content cache operations or both. In cache operations, the cache recognizes the object requested by the user and serves the content from local content cache rather than forwarding the request on the $2^{nd}$ interface.

Figure 9:
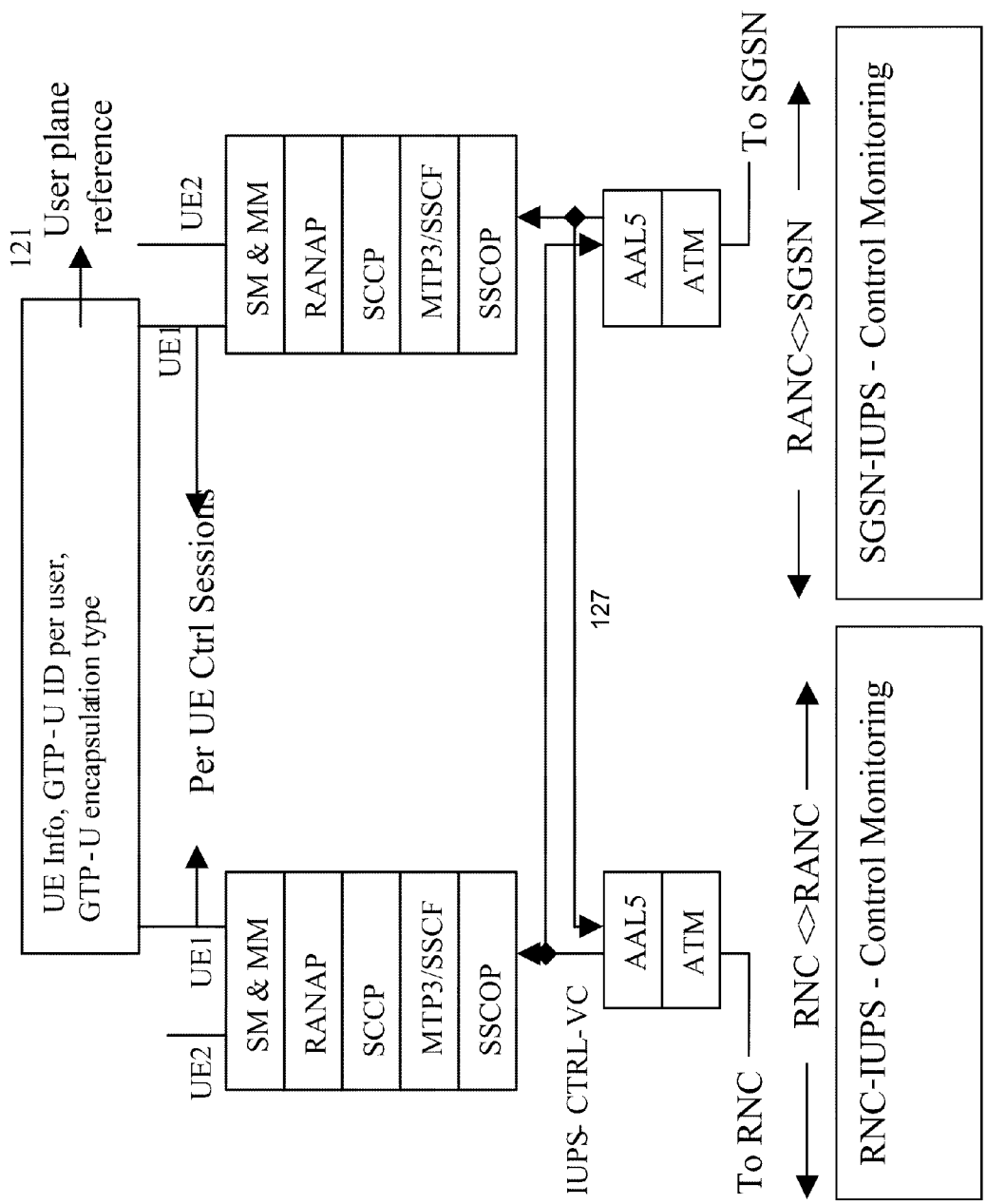
FIG. 9 illustrates RAN-Cache operation in the control plane while intercepting IuPS control plane traffic in deployment configuration in FIG. 4.
Figure 11:
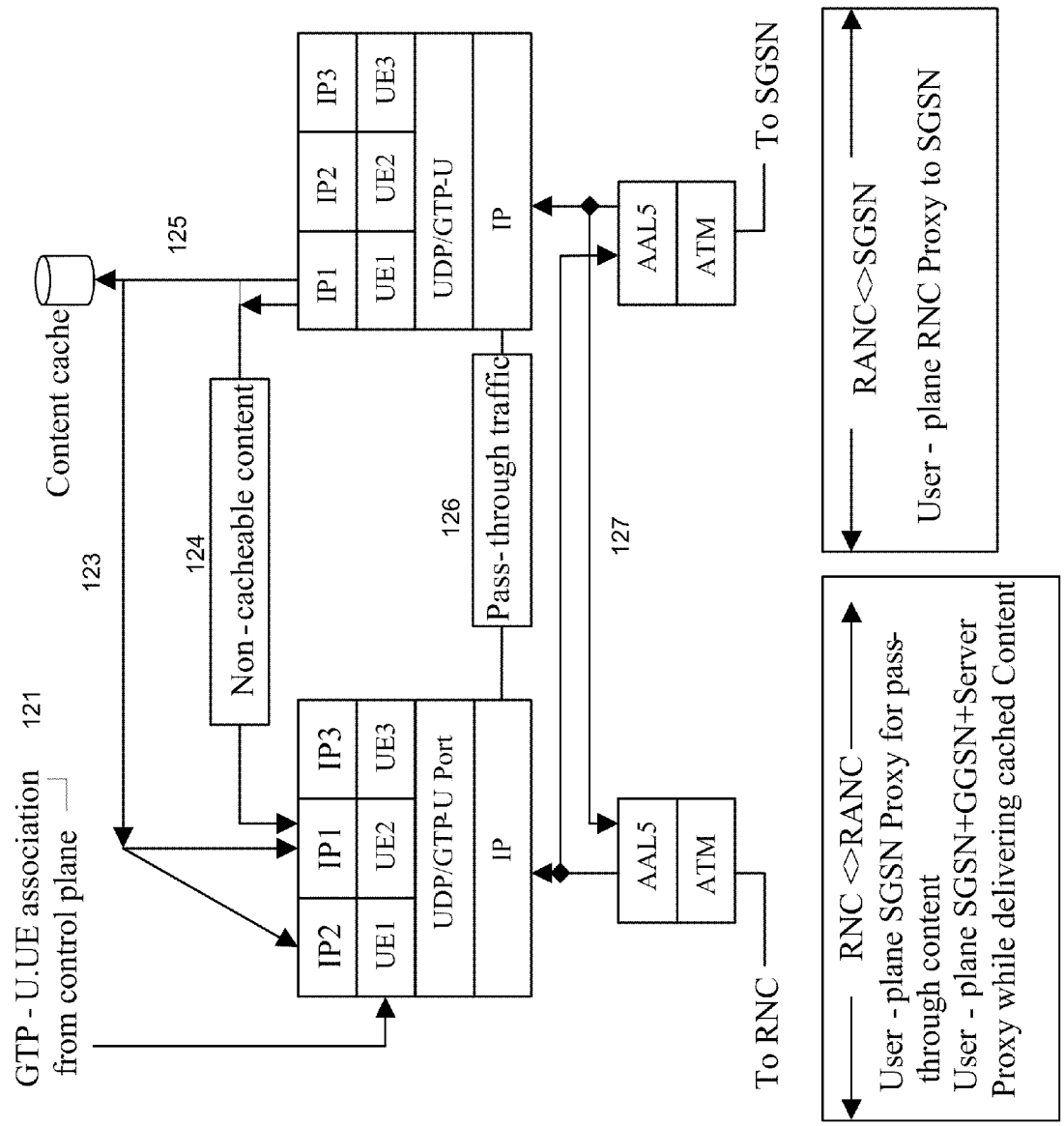
FIG. 11 illustrates the RANC operation as double proxy in the user plane while delivering content cached in RANC, and cache-missed content through SGSN.

FIG. 9 illustrates RAN-Cache (RANC) operation in the control plane while intercepting IuPS control plane traffic in deployment configuration in FIG. 4. The protocol layers shown in the figure are as specified in the 3GPP/UMTS standards. This figure shows the RANC extracting GTP-U tunnel information 121 per user session (per UE for specific service type). The RANC then identifies the information 121, which may include, but is not limited to, the user service type, device type, Radio Bearer, GTP-U/ID and GTP-U encapsulation type. This information 121 is associated with the corresponding per user session GTP-U traffic in the user plane (see FIGS. 9 and 11). Each GTP-U tunnel carries data traffic for a particular service flow of a UE in the user plane (as shown in FIG. 8). Control plane monitoring in FIG. 9 facilitates identifying the corresponding user, user device, and QOS attributes for the user session in the Radio Access Network. FIGS. 9 and 11 show an optimization that can be performed to improve performance with the RANC. In this embodiment, AAL5 (ATM Adaptation Layer 5) packets are received on each interface. After receipt, a local copy of the packet is saved. This local copy is then presented to the higher layers for decoding and extracting UE Session information. In the same time, the received AAL5 packets are passed via path 127 to the second interface, where they are transmitted.

Figure 10:
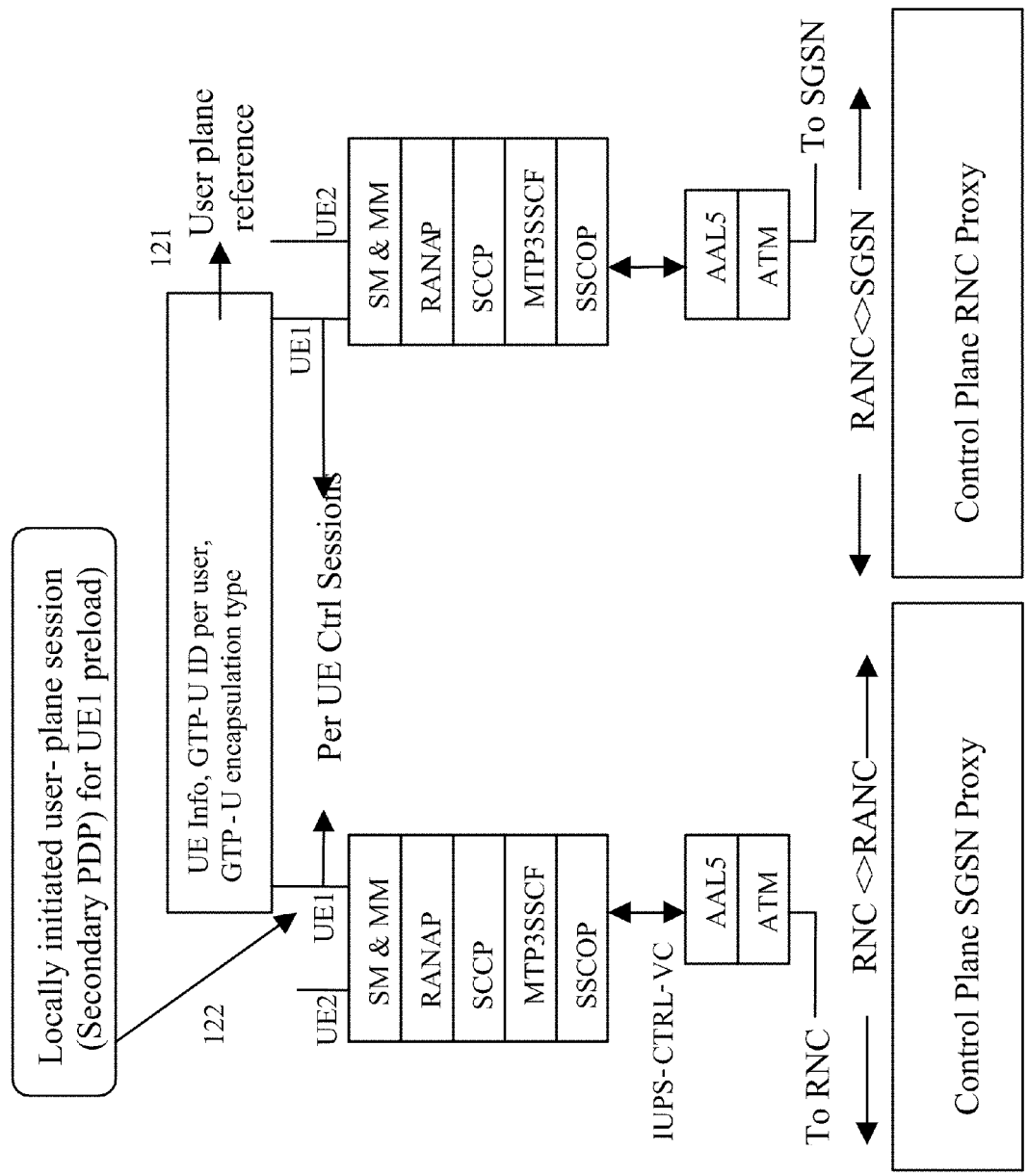
FIG. 10 illustrates a RANC initiated UE session, operating while another RAB is active between two network nodes to which the RANC is connected.

FIG. 10 illustrates a RANC initiated UE session. In addition to monitoring control plane traffic, as described in reference to FIG. 9, the present invention allows modification of information elements in the control protocol, and insertion of protocol packets for initiating additional sessions from the interception point. These operations are performed by the RANC, functioning as a double proxy at the interception point in the control and user planes as illustrated in FIGS. 10 and 11. FIG. 10 shows control protocol operation for initiating a new session to the UE for delivering content from local cache for a different service flow. In this scenario, the RANC multiplexes control packets received from the SGSN destined for the RNC, with a locally initiated session (secondary PDP) establishment procedure to setup a new GTP-U tunnel in the user plane. Similarly, when control packets are received from the RNC, the RANC, acting as Control-plane-SGSN proxy, receives control packets from RNC, and identifies responses for the locally initiated operation, and forwards the remaining packets to the SGSN. The RANC could initiate a new session for pre-loading a UE (for example for delivering frequently viewed, or user configured content) or for improving the QOS for delivering premium content (for example a multi-media content that requires a different QOS attributes). In other words, the RANC is able to pass through packets between the SGSN and the RNC, while also injecting and receiving packets from the RNC that are terminated at the RANC.

FIG. 10 shows the RANC initiating a second RAB (Radio Access Bearer) for delivering content stored in the RANC while another RAB is active between two network nodes to which the RANC connects. This figure shows locally initiated user-plane session traffic 122 being multiplexed/de-multiplexed with the transit traffic at the SM&MM interface for the specific UE.

FIG. 11 illustrates the RANCache (RANC) operation as a double proxy in the user plane while delivering content cached in RANC, and cache-missed content and pass through content from the SGSN. User plane GTP-U traffic of this UE 121 is obtained using corresponding session information in the control plane as shown in FIG. 9. In some transactions, locally cached data 123 is delivered from RANC cache after encapsulating the payload GTP-U protocol to the UE. Non-cacheable traffic 124 is forwarded from the SGSN interface to the RNC interface. Also illustrated is cache-miss operation. In this case, the RANC fetches application data from SGSN, fills local cache, and forwards to the RNC after re-encapsulating with the corresponding user plane protocols. In addition to passing the data to the RNC, the RANC also stores the returned application data 125 in its content cache. Operations involving cached data 123, non-cached data 124 and to-be-cached data 125 involve additional protocol (TCP, UDP, HTTP, FTP etc.) specific processing above the user IP layer (IP1, IP2, IP3).

FIG. 11 also shows the forwarding of other IP traffic 126, such as packets that are not GTP-U. These are forwarded by RANC between the two interfaces to which it connects. Thus, this figure shows per user GTP-U tunnels, forwarding portions of the traffic above the bearer plane IP layer (IP1, IP2, IP3), and other portions of the traffic being passed through at the transport IP layer 126. While forwarding bearer plane IP packets, the RANC functions as a multi-protocol proxy. For example, it extracts TCP Port 80 packets from the RNC and performs web caching and proxy operations. For other protocols such as FTP, RTP, it performs protocol specific caching, transport level (TCP/UDP) or application layer optimizations before re-encapsulating the user payload packets with the corresponding interface protocol.

Further detailed description is now provided for the operation of the RANC. Reference is made to FIGS. 7-11, as appropriate.

First, in order to properly operate, the RANC must be logically invisible to the surrounding devices. This is accomplished by acting as a proxy device. The RANC intercepts the control protocol, such as IuB, IuPS or Gn, and functions as a proxy. In other words, in the embodiment shown in FIG. 4, the RANC 112 emulates the behavior of the SGSN 104 when it receives control packets from RNC 105. Similarly, the RANC 112 appears as a RNC 105 while sending packets to SGSN 104. In order to emulate the proxy function, it snoops packets from both the RNC 105 and SGSN 104 and forwards these packets to the other device. FIG. 7 shows the corresponding protocol layers between the RNC 105, the RANC 112 and the SGSN 104, for both the IP transport and ATM transport embodiments.

By snooping the packets, the RANC 112 identifies when the data path tunnel is established (i.e. PDP context is attached) and determines the associated subscriber identity. The RANC 112 may parse the Radio Access Bearer (RAB) establishment messages within in RANAP protocol to identify the GTU-Tunnel ID, and the corresponding UE session. This process establishes a context between the data-path tunnel (GTP-U tunnel) and the associated user.

Alternatively, rather than learning the context from the IuPS control path, the RANC 112 monitors new user plane tunnels (GTP-U tunnels), and corresponding IP addresses (within the GTP-U tunnel). When a new GTP-U tunnel is recognized, it extracts the user IP address within the tunnel and queries an external service plane network element such as a RADIUS server to map the IP address to a user identification and the corresponding user profile. Information such as whether the user is pre-paid or post-paid, and the rate plan (unlimited or limited plan, type of data services authorized etc.) may be obtained in this manner. Although this requires access to the RADIUS server, it minimizes the amount of context that the RANC 112 must parse from the transmitted packets.

UE Information, such as that parsed by snooping RAB establishment messages, or by using the RADIUS server, as described above, may also be used in a number of ways. For example, using these techniques, the RANC may obtain User Profile information such as Rate Plan, User Priority, level of authorization (general internet, operator specific on-deck content). Knowing this information, the RANC may then prioritize traffic while delivering data to the RNC.

For example, a user's rate plan may include a quota limit per month (Mbytes/Gbytes per month), and Fair-usage or best effort service beyond the quota limit, etc. When a user session is established, by monitoring the control plane protocols, the RANC determines that the specific UE is subject to a Fair-Usage policy. Thereafter, when congestion is detected, or data volume to the RNC increases and approaches peak, the RANC limits traffic to the UEs subject to the Fair-Use policy. Methods to limiting traffic include, not delivering from local Cache and/or turning off optimizations for these User Sessions.

In another example, an operator offers on-deck content as an additional service/rate plan. During session establishment, the RANC determines if a specific UE has subscribed to on-deck content, and delivers any cached content from the on-deck sites, only if the user subscribed to such a rate plan.

Information parsed by monitoring the RANAP protocol can also serve other purposes. For example, by monitoring RANAP protocol on the IuPS interface (see FIG. 7), the RANC may identify the User plane packet encapsulation type for each user session. It may then use this packet encapsulation type for decoding user plane protocols for each session. Alternatively, the RANC may decode the tunnel packet type of each user GTP-U tunnel to fully decode the user plane packets.

From monitoring RANAP messages, the RANC may also identify the unique International Mobile Equipment Identifier (IMEI) or Mobile Equipment Identifier (MEI), and the type of device (such as iPhone®, BlackBerry®, laptop computer, etc.). In addition to or alternatively, the RANC may identify the User Agent type such as the type of web-browser (Internet Explorer, Safari, FireFox etc.), the type of OS (Windows XP, MAC OS, etc.), from HTTP Requests within the user plane GTP-U packets received from RNC.

The device type determined above can be used to format or process the packets. For example, while delivering cached or un-cached (cache-miss) content retrieved from internet servers, the RANC may use the UE type information to perform device specific content adaptation. Such adaptations include but are not limited to, formatting to the screen size, and selecting an alternate file with different resolution. In one particular embodiment, a website may offer a video in two or more resolutions. Based on UE type information, which the RANC determined by decapsulating and decoding RANAP messages, the RANC may optimize the user experience by selecting the resolution best supported by the UE device.

As described above, the RANC can parse RANAP messages. By monitoring the Radio Access Bearer (RAB) Assignment Requests within the RANAP messages, the RANC may identify the QOS parameters to be used for a specific UE. Example QOS parameters include, but are not limited to, type of service, Maximum Bit Rate (MBR), Guaranteed Bit Rate (GBR), and Traffic Handling Priority. By knowing these QOS parameters, the RANC may perform content optimizations, such as prioritizing Audio streams while delivering multi-media content. One example showing the application of QOS parameters by the RANC follows. Assume that the user establishes a RAB, and the MBR parameter in the RAB Assignment Request message specifies 100 Kbps, and the user selects a High Definition streaming video that requires 300 Kbps. The user's selection request is received through GTP-U tunnel corresponding to the specific RAB by RANC. The RANC first determines if the multi-media object is in its cache, or whether it needs to be fetched from remote server. In either case, the RANC processes the protocol headers, and application specific content headers (such as FLV headers), recognizes the selected content requires 300 Kbps rate. Since the RANC is aware that the user device is only capable of supporting 199 Kbps, the RANC delivers only audio portion of the stream, thereby adhering to the MBR parameter.

An additional application of monitoring the control plane information is the identification of the location area to which the UE is attached. In some radio network deployments, the location area corresponds to the specific wireless sector. Since the RANC is intercepting all of the user plane traffic on the interface, with control plane correlation, it can identify the total traffic targeted to a particular sector. Based on the total identified traffic, the RANC may determine when a sector is nearing congestion. When sector congestion is detected, the RANC may attempt to reduce congestion by limiting the traffic sent to peak users, limiting multimedia streams, or controlling traffic to specific types of devices (for example to PC interface cards).

Using the UE data as described above, in conjunction with the QOS information, the RANC may prioritize the per User GTP-U traffic for the purpose of improving the quality of experience for a number of users. Such prioritizations include, but are not limited to, throttling peak users, and fair usage policy during periods of congestion. For example, the RANC may detect that one or more devices is creating the vast majority of the traffic, and throttling traffic to other devices. The RANC may use some algorithm to throttling back to offending devices.

Within each GTP-U tunnel, the RANC may further decode the IP-Packet type, IP-Protocol type (TCP, UDP), and SRC/DST Port numbers to identify the application protocol type (for example Web/HTTP traffic), RTP Traffic, FTP traffic, RTMP, Object type (for example html, flv, .mp4, .mp3 file types) etc. For each protocol-type, RANC may perform application specific decoding and optimizations. As explained above, for HTTP traffic, this may include the creation of a cache. For other protocols, for example for FTP traffic, the RANC may perform split TCP operations, by separating the RANC to UE TCP connection from the RANC to internet server TCP connection. The FTP object may also be cached by the RANC by using a caching and replacement policies for FTP objects. In another example, for live streaming with RTP, the RANC maintains a local transit buffer and satisfy UE retransmission requests from its local buffer rather than forwarding retransmission requests to the internet server.

For each Subscriber/GTP-Tunnel, the RANC identifies TCP packets and performs TCP Proxy operations. The TCP proxy operations include, but are not limited to, maintenance of separate TCP connections to the UEs, while establishing TCP connections as needed with servers towards the Core Network, maintenance of transit buffer, and local retransmissions to the UEs. While some TCP proxy operations may be known in prior art, the RANC is unique in that, in order to provide these services, it must decapsulate and remove other interface protocols. Other devices that perform TCP split or proxy operations do so while transmitting IP packets. However, as seen in FIGS. 3-6, the RANC can operate using a variety of interface protocols that embed user TCP/IP payloads in IP or non-IP transports, and still perform these TCP functions.

As can be seen by the examples above, monitoring of the RANAP protocol allows the RANC to determine specific actions being requested by the devices on either side of the RANC. Based on this knowledge, the RANC can augment or modify the packets being transmitted so as to better customize them for the specific UE. In another embodiment, the RANC improves response time and lowers overall network by caching some frequently used content.

The RANC may maintain a cache of frequently accessed web pages, video clips, FTP files etc. Such content caching may be common across all users—thus cache replacement and refill is independent of number of users. Thus, this reduces latency and improves quality of experience for users that access the top content. Alternatively, caches can be segmented such that each user's content occupies a percentage of the entire cache. Mechanisms to determine which content should be stored in the cache in the RANC and how to segment the cache currently exist and are known to those of ordinary skill in the art.

The RANC may also maintain a history of frequently accessed content for each user. While caching and replacing content, the RANC may retain a minimum percentage of content for each user. Thus, the cache may improve the total quality of experience for large set of users.

In the User Plane traffic received from RNC, the RANC may extract bearer IP packets within each per user GTP-U tunnel, identify protocol type, type of information requested (for example URL information for HTTP traffic), and compare against the locally cached content. If the requested URL is found in the cache, the RANC returns responses, thus delivering the requested information. While returning these responses, the RANC emulates the SGSN and GGSN so as to be indistinguishable to the RNC. Thus, the RANC creates bearer IP packets and sends them in the corresponding GTP-U tunnel. Similarly for FTP traffic, the RANC emulates the FTP server while returning requested file from the local cache. If the user requested information is not found in the cache, it reconstructs the request emulating an RNC/IuPS processing and forwards to the Core Network (SGSN/GGSN).

The RANC may adjust the sequence numbers within the per user service flow (GTP-U) packets if the sequence number option is used on the IuPS interface. For example, suppose the RANC delivers a cached object from its local cache, which requires transferring 100 GTP-U packets to the RNC. Each GTP-U packet must have a unique sequence number and therefore, the corresponding sequence numbers in the GTP-U header would be incremented. Since this object is not fetched through SGSN, sequence numbers used between the RANC-RNC and the SGSN-RNC now differ by 100. To compensate for this difference, the RANC may adjust the GTP-U sequence numbers for subsequent packets that are forwarded from the SGSN to the RNC for the specific GTP-U tunnel.

For protocols in the bearer IP plane that the RANC does not provide performance assistance or caching, it receives the packets from one interface (RNC or SGSN) and forwards to the other interface (SGSN or RNC) after re-adjusting the GTP-U sequence numbers, if necessary.

Another aspect of the current invention is to opportunistically inject content in the User plane to a specific UE, based on information learned from the control plane (such as location area, device type etc., that described earlier), and the content-aware application processing in the user plane. Such opportunistic content could be contextual, based on the user's access history, location area, advertisement content, etc. For example, while processing http requests, the RANC processes both http requests and http-responses. While processing the http responses, the RANC identifies the content type (such as html pages). To inject opportunistic content, the RANC may modify the html page to include additional URL links, additional html content, or java scripts, etc. Thus, when the UE client receives the page, the page contains the original page from origin server, as well as RANC determined content. While methods of modifying web-page contents are known in prior art, the present invention, is able to determine this additional content based on information derived from control and user planes after decapsulating the interface protocols.

The placement of the RANC in the network may enable additional functionality. In one embodiment, the RANC is deployed between the Cell Station (NodeB, BTS) and the Cell Station Controller (RNC, BSC, or ASN Gateway in WiMax), as shown in FIG. 3. One example deployment is RANC deployment on the IuB interface in 3G Network. In this configuration, the RANC monitors the Radio Link Control protocols exchanged between the NodeB and RNC. In this way, the RANC is aware of the per subscriber radio link quality. Based on the Radio Link to the mobile device, the RANC modifies the content. For example, the RANC, in response to the link quality, may transcode, prioritize specific types of content frames, such as audio streams only, deliver MPEG I-frames only or discard packets to poor quality links. Other actions which affect the content based on the link quality can also be performed.

In a specific embodiment, the RANC may be configured to intercept the BTS< >RNC protocols (IuB Interface protocols), as shown in FIG. 3. In this embodiment, it may monitor "Over the Air Band Width (OTA-BW) by snooping the CQI (Channel Quality Index) exchanged between the BTS and RNC. The RANC may then use the CQI to prioritize and select optimal content to the UE. For example, while delivering multi-media streaming content, it may prioritize Audio over Video, or prioritize web traffic over FTP traffic. While delivering web pages, it may prioritize traffic based on content type, for example, text objects over image objects. Thus, the use of the CQI to prioritize, or re-prioritize traffic flow can be achieved by the RANC. Decisions regarding that prioritization of traffic are application specific, and are not limited by this invention. The examples given above are not intended to be limiting; rather they are merely illustrative of the possible optimizations that can be performed.

While monitoring the CQI as described above, the RANC may adjust the TCP congestion window for a specific TCP session to the UE. The TCP congestion window is a measure of the number of bytes that can be outstanding at a particular time. This adjustment may be to achieve a plurality of objectives, such as but not limited to, achievement of maximum throughput to the UE (across traffic for all flows to the specific UE), reduction of packets in flight across all flows to the UE thereby reducing response times for new user inputs, reduction of congestion at the RNC, and optimal throughput to all users while maintaining fairness to active users.

Another aspect of the current invention is TCP optimizations in the user IP traffic of each UE based on Over the Air-Bandwidth (OTA-BW) and Round Trip Time (RTT) for TCP Connections between the RANC and UE. In the embodiment above, the RANC obtains OTA-BW from CQI when placed between the BTS and the RNC. Alternatively, the RANC may obtain OTA-BW information by explicitly requesting such information from either the UE or the RNC. In another embodiment, the RANC determines OTA-BW and RTT information by monitoring recent traffic to the UE or by explicitly sending protocol level or application level PING to the UE. Based on the estimate of the OTA-BW, and the RTT, the RANC adjusts the initial TCP congestion window for maximal system throughput. Adjusting the TCP congestion window based on throughput and RTT has been done in the prior art, however, the RANC is unique in the way that it acquires OTA-BW and RTT information.

Mobility is one important aspect of wireless access networks, such as 3G, LTE, CDMA and WIMAX. Since the subscriber handset or laptop may move from a cell coverage area served by one cell site (BTS or NodeB) to another cell coverage area, the RANC must address mobility issues, depending on its location within the network (i.e. which interface it is intercepting). Thus, if content to a specific mobile device is delivered from a RANC in one location, when the mobile device moves to a different location, the context of previous content delivery and any associated transfer state would have to be transferred from the previously accessed RANC to the RANC in the new coverage area. The invention outlines methods to continue active traffic through RANC in the new coverage area and transfer context between the 2 RANCs in a mobile wireless environment.

Figure 12:
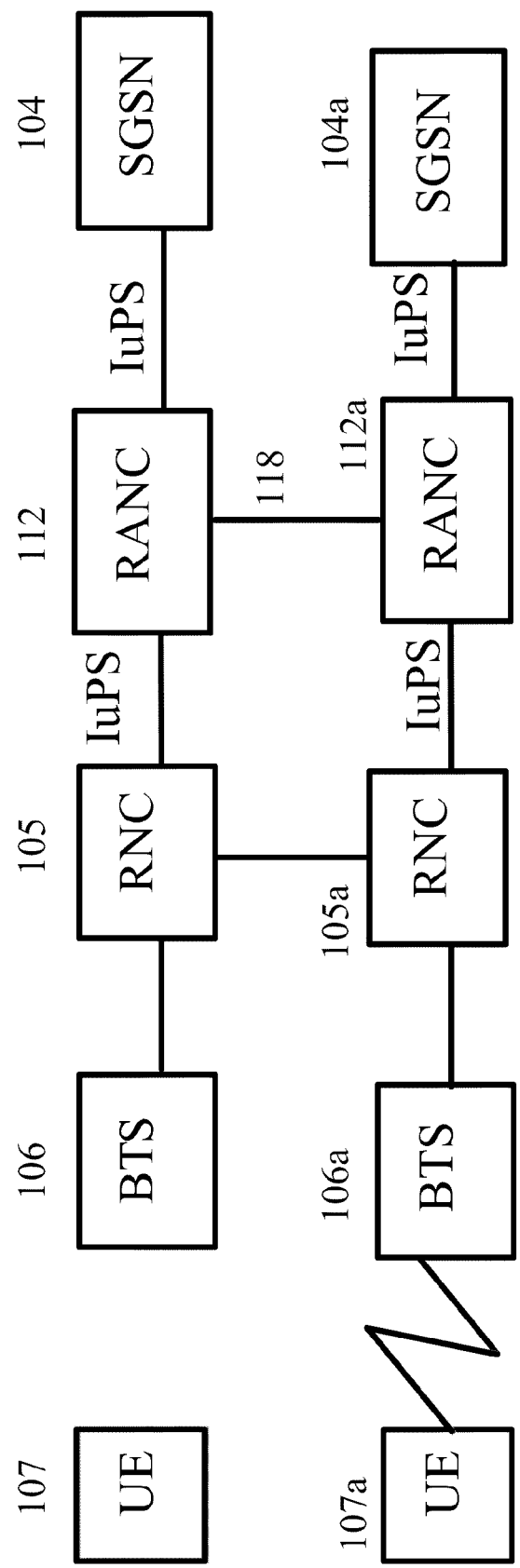
FIG. 12 illustrates the environment where the RANC is placed on IuPS interface for handling mobility of a UE from the scope of one RNC to another RNC.

FIG. 12 illustrates the environment for the RANCache, when placed on IuPS interface, for handling mobility of a UE from the scope of one RNC to another RNC. 3GPP standards define mobility and handover operations for handling mobility of UE from one RNC 105 (Source RNC) to another RNC 105a (Target RNC) within one SGSN or across 2 different SGSNs. The 3GPP standard protocols, and specifically 3GPP TS25.410, which is herein incorporated by reference in its entirety, define relocation procedures by which Source RNC 105 moves an active session of a UE to another RNC 105a. When the RANC 112 is placed between RNC 105 and SGSN 104 on the IuPS interface, as shown in FIG. 12, Source RANC 112 recognizes the specific UE relocation and initiates context handover for the content that it is serving from its local cache or providing TCP/UDP level application forwarding. Any traffic that the source RANC is passing through continues to pass through in the target RANC.

For supporting mobility, each RANC communicates with its neighboring RANCs. Each RANC maintains the identification of RNC that it is connected to, and the list of RANCs and the RNCs that they connect to. While monitoring IuPS control protocol as described earlier, Source RANC 112, which connects to Source RNC 105, recognizes a relocation request and the identification of the target RNC. It determines the Target RANC 112a that connects to target RNC 105a and initiates a context transfer with the target RANC. The Source RANC handles relocation of a UE for which it is performing content aware operations to the Target RANC by two basic operations. First, as shown in FIG. 12, the current RNC 112 transfers the UE context, including user subscription, GTP-U tunnel information and other information, to the target RANC 112a. Second, for an ongoing transfer (for example, an active TCP traffic), the source RANC 112 continues to send and receive traffic from the UE through its new coverage area (i.e., through new BTS 106a, target RNC 105a) through the target RANC 112a using the inter RANC link 118. In the uplink direction (traffic received from UE), target RANC identifies traffic for new flows (new TCP connections, DNS requests, UDP Requests) as opposed to the traffic for previously active flows (such as TCP ACKs, RTP retransmission requests etc.). It forwards the packets for already active flows to the source RANC, and processes traffic for new flows locally. In the downlink direction (traffic to the UE), the target RANC receives downlink packets for already active flows from the source RANC, and handles traffic for new flows locally. Thus the source RANC 112 continues to supply cached content or any other TCP/UDP data for active flows. This step also includes the target RANC 112a recognizing new flows from UE and anchoring them at the same time forwarding already active flows through the source RANC 112.

What is claimed is:

1. A method of delivering cached information in a wireless radio access network (RAN), wherein said RAN services a plurality of users, and comprises a plurality of components, wherein said method comprises:
   a. logically inserting a device between a first and second component in said RAN, said device comprising a storage element, control logic and two interface modules, such that said device communicates with both said first and said second component;
   b. using a first of said interface modules to emulate said first component to said second component;
   c. using a second of said interface modules to emulate said second component to said first component;
   d. using said control logic in said device to identify when a data path tunnel is established and the user associated with said tunnel, and to interpret a communication from said first to said second component, so as to determine the content of said communication, wherein said communication comprises a plurality of protocol layers;
   e. storing content in said storage element;
   f. determining using said control logic whether said communication is a request for content, and if so, determining whether said requested content is stored in said storage element; and
   g. transmitting using said second interface module said stored content to said first component.

2. The method of claim 1, wherein said RAN comprises a NodeB, a RNC, a SGSN, and a GGSN, and wherein said device communicates with said RNC and said SGSN.

3. The method of claim 1, wherein said RAN comprises a NodeB, a RNC, a SGSN, and a GGSN, and wherein said device communicates with said GGSN and said SGSN.

4. The method of claim 1, wherein said RAN comprises a NodeB, a RNC, a SGSN, and a GGSN, and wherein said device communicates with said RNC and said NodeB.

5. The method of claim 1, wherein said plurality of layers comprises a RANAP protocol layer and said control logic interprets said RANAP protocol.

6. The method of claim 1, where in said RAN comprises an eNodeB, a SG, a MME and a PDN-GW operating in a LTE network, wherein said device communicates with said eNodeB, said SG and said MME.

7. The method of claim 1, wherein said RAN comprises an eNodeB, a SG, a MME and a PDN-GW operating in a LTE network, wherein said device communicates with said SG, said MME, and said PDN-GW.

8. The method of claim 1, wherein said device transmits said communication using said first interface module if said communication is not a request for content stored in said storage element.

9. A method of delivering user specific information in a wireless radio access network (RAN), wherein said RAN services a plurality of users, and wherein said RAN comprises a plurality of components, comprising:
 a. logically inserting a device between a first and second component in said RAN, said device comprising a storage element, control logic and two interface modules, such that said device communicates with both said first and said second component;
 b. using a first of said interface modules to emulate said first component to said second component;
 c. using a second of said interface modules to emulate said second component to said first component;
 d. using said control logic in said device to interpret a communication from said first to said second component, so as to determine when a data path tunnel is established, the user associated with said tunnel, and specific parameters associated with said user, wherein said communication comprises a plurality of protocol layers;
 e. determining using said control logic whether a response to said communication should be modified based on said specific parameters;
 f. transmitting using said first interface module said communication to said second component;
 g. receiving a response from said second component using said first interface module; and modifying said response based on said determination; and
 h. transmitting using said second interface module said response to said first component.

10. The method of claim 9, wherein said RAN comprises a NodeB, a RNC, a SGSN, and a GGSN, and wherein said device communicates with said RNC and said SGSN.

11. The method of claim 9, wherein said RAN comprises a NodeB, a RNC, a SGSN, and a GGSN, and wherein said device communicates with said GGSN and said SGSN.

12. The method of claim 9, wherein said RAN comprises a NodeB, a RNC, a SGSN, and a GGSN, and wherein said device communicates with said RNC and said NodeB.

13. The method of claim 9, wherein said plurality of layers comprises a RANAP protocol layer and said control logic interprets said RANAP protocol.

14. The method of claim 9, where in said RAN comprises an eNodeB, a SG, a MME and a PDN-GW in a LTE network, wherein said device communicates with said eNodeB, said SG and said MME.

15. The method of claim 9, wherein said RAN comprises an eNodeB, a SG, a MME and a PDN-GW in a LTE network, wherein said device communicates with said SG, said MME, and said PDN-GW.

16. A network device, adapted to operate on a RAN network, wherein components in said RAN network communicate using a plurality of protocols, said device comprising:
 first and second interface modules, adapted to communicate with a respective first and second component in said RAN network, such that a first of said interface modules emulates said first component to said second component and a second of said interface modules emulates said second component to said first component;
 a storage device; and
 control logic, wherein said control logic is adapted to interpret said plurality of protocols in a communication between said first and second component and to determine when a data path tunnel has been established and the user associated with said tunnel.

17. The network device of claim 16, wherein said control logic interprets said communication to be a http request from said first component to said second component, and wherein said control logic stores a response to said communication from said second component in said storage device.

18. The network device of claim 16, wherein said control logic is adapted to:
 interpret a communication from said first component to said second component, so as to determine the content of said communication;
 determine whether said communication is a request for content, and if so, determine whether said requested content is stored in said storage element; and
 transmit said stored content to said first component using said second interface module.

19. The network device of claim 16, wherein said control logic is adapted to:
 interpret a communication from said first to said second component, so as to determine the user of said communication, and specific parameters associated with said user;
 determine whether a response to said communication should be modified based on said specific parameters;
 transmit said communication to said second component using said first interface module;
 receive a response from said second component using said first interface module;
 modify said response based on said determination; and
 transmit said response to said first component using said second interface module.

20. The network device of claim 16, wherein said plurality of protocols defines a control plane and a user plane, and wherein said control logic is adapted to:
 interpret a communication between said first and second component so as to determine control plane parameters; and
 utilize said control plane parameters in said user plane.

21. The network device of claim 20, wherein said control plane parameters are selected from the group consisting of RAN congestion, user device information, user subscription plans, QOS attributes and location information.

22. A method of modifying communications to a user on a RAN network, based on user specific information, wherein said network comprising a plurality of components, comprising:
 logically inserting a device between a first and second component in said RAN, said device comprising a storage element, control logic and two interface modules, such that said device communicates with both said first and said second component;
 using a first of said interface modules to emulate said first component to said second component;

using a second of said interface modules to emulate said second component to said first component;

Using said control logic in said device to interpret a communication from said first to said second component, wherein said communication comprises a plurality of protocol layers and said protocols define a control plane and a user plane;

saving information from said control plane and associating it with said user;

modifying communications at said user plane destined for said user, based on said saved control plane information; and transmitting said modified information toward said user.

23. The method of claim 22, wherein said control plane information is selected from the group consisting of RAN congestion, user device information, user subscription plans, QOS attributes and location information.

24. A method of delivering content to a mobile user in a radio access network (RAN), wherein said RAN network comprises a plurality of radio network controllers (RNCs) and a cache device associated with each of said RNCs, said method comprising:

using a first cache device to intercept communications from said RNC to the internet, wherein said communication comprises a plurality of protocol layers and said protocols define a control plane and a user plane;

using said first cache device to detect the movement of said user by monitoring said control plane;

using said first cache device to maintain an association of RNCs and the corresponding cache device, so as to determine said target cache device when a relocation request is detected in said control plane; and performing a session handover from said first cache device to said target cache device after detecting said relocation request.

25. The method of claim 24, further comprising:

using said target cache device to differentiate ongoing user plane traffic and new user plane traffic.

26. The method of claim 25, further comprising:

using said target cache device to deliver said ongoing user plane traffic to said first cache device.

27. The method of claim 26, further comprising:

using said target cache device for new user plane traffic.

28. The method of claim 25, wherein said user plane traffic comprises TCP connections.

* * * * *